United States Patent
Herrera et al.

(10) Patent No.: US 6,292,023 B1
(45) Date of Patent: Sep. 18, 2001

(54) SPIKE-TRIGGERED ASYNCHRONOUS FINITE STATE MACHINE

(75) Inventors: Ruben Herrera, New York, NY (US); Rahul Sarpeshkar, Cambridge, MA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/407,533

(22) Filed: Sep. 29, 1999

(51) Int. Cl.[7] ............................. H03K 19/173; G06F 7/38
(52) U.S. Cl. .............................................. 326/46; 327/208
(58) Field of Search ....................... 326/46, 40; 327/199, 327/202, 208

(56) References Cited

U.S. PATENT DOCUMENTS

| | | |
|---|---|---|
| 4,648,105 * | 3/1987 | Priebe et al. .......................... 377/64 |
| 4,740,891 | 4/1988 | Kirkpatrick . |
| 5,097,151 | 3/1992 | Eerenstein et al. . |
| 5,412,795 | 5/1995 | Larson . |
| 5,469,079 * | 11/1995 | Mahant-Shetti et al. .............. 326/46 |
| 5,612,632 * | 3/1997 | Mahant-Shetti et al. .............. 326/46 |
| 5,706,473 | 1/1998 | Yu et al. . |
| 5,789,956 * | 8/1998 | Mahant-Shetti et al. ............ 327/202 |

* cited by examiner

Primary Examiner—Michael Tokar
Assistant Examiner—Daniel D. Chang
(74) Attorney, Agent, or Firm—William Ryan (57) ABSTRACT

A finite state machine in which n discrete states of the machine are encoded using a set of n bistable elements permitting simplified decoding of states. Transitions between discrete states are illustratively executed by selectively directing a bistable device to a 1 state using transition circuits activated by positive transitions of asynchronous spiking inputs. In one illustrative embodiment the positive transition is capacitively coupled to a switch that connects the complement output of a bistable element to ground, thereby causing the nominal output of that element to approach a voltage corresponding to a 1 state. In a second illustrative embodiment a pass transistor combination maintains a capacitor at the nominal output voltage of the bistable element in a 1 state until a spiking input signal arrives. A combination of the spiking input signal and the voltage on the capacitor connects the complement output of another bistable element to ground, thus switching that other bistable element.

22 Claims, 5 Drawing Sheets

SPIKE-TRIGGERED ASYNCHRONOUS FINITE STATE MACHINE

RELATED APPLICATIONS

Subject matter relating to that of the present application is presented in U.S. Patent applications filed on the same day as this application: "Spiking Neuron Circuit" by R. Sarpeshkar; and "Edge-Triggered Toggle Flip-Flop Circuit," by R. Herrera and R. Sarpeshkar. These applications are assigned to the assignee of the present application and are hereby incorporated by reference in the present application.

1. Field of the Invention

The present invention relates to electronic circuits, for implementing (usually complex) logical functions—including computers—as finite state machines. More particularly, the present invention relates to asynchronous finite state machines. Still more particularly, the present invention, in its various embodiments, relates to spike-triggered asynchronous finite state machines.

2. Background of the Invention

Finite State Machines are fundamental to all aspects of digital computation. All computers in use today may be viewed as nothing more than very complex finite state machines operating on inputs from memory. More generally, a finite state machine (or sequential machine) may be considered to be a machine having a number of states, with inputs and outputs, and in which transitions between states is determined by a current state and inputs. See, for example, *Dictionary of Computing*, Oxford University Press, Oxford, Third Edition, 1990.

While finite state machines have been designed for many particular applications, most are designed to respond to synchronous signals, i.e., clocked inputs and state transitions. When asynchronous inputs are received, some finite state machines known in the art provide specific adjustments or compensation techniques to accommodate such inputs in primarily synchronous contexts. Such accommodations to asynchronous behavior impose restrictions on design flexibility and penalties measured, for example, in increased complexity. Many system applications, including some modeled after animal sensory and brain functioning, are inherently asynchronous over all or a significant portion of their processing activities, and so are not readily represented using standard synchronous finite state machine techniques.

In common practice, n-state finite state machines are realized with $\log_2 n$ bistable elements that code the present state and receive periodic (synchronous) trigger signals. To trigger a change to the next state, a decoded representation of the current state is logically combined with zero or more logic inputs. Therefore, while the use of $\log_2 n$ binary elements provides an efficient coding scheme in prior art finite state machines, complexity of decoding of state information increases in proportion to the number of states n.

State encoding in prior art n-state finite state machines employing $\log_2 n$ bistable elements permits exactly one stable state to exist at a time. However, certain logical schemes and applications profit from so-called parallel-evolution processing in which one or more initial conditions (present states) are allowed. See for example, Zhang J., and Kumar S. (1997), Detection of convergent and parallel evolution at the amino acid sequence level. *Mol. Biol. Evol.* 14: 527–536. Other parallel evolution applications include processing of weights or organizations in neural network applications. In parallel-evolution processing, transitions can occur to fewer succeeding states (convergent evolution) or to a greater number of succeeding states (divergent evolution). As is readily apparent, state encoding using the prior art $\log_2 n$ binary elements does not readily lend itself to parallel evolution processing for important classes of applications.

SUMMARY OF THE INVENTION

Limitations of the prior art are overcome and a technical advance in Finite State Machine design and use are achieved in accordance with the present invention, illustrative embodiments of which are described below.

Briefly, embodiments of the present invention feature finite state machines in which n discrete states of the machine are encoded using a set of n bistable elements. Though conventional use of $\log_2(n)$-element binary state encoding would appear to offer complexity advantages, n-element state coding in accordance with present teachings permits simplified decoding of states in the machine. Resources saved in the decoding of the states, which scale in proportion to n in conventional machines, more than compensates for resources used in n-element state encoding.

Further, the n-element encoding allows for the simultaneous evolution of multiple initial-condition states in the machine in a concurrent fashion. Thus, for example, n bistable elements, with n=8, produces state information illustratively represented (for an arbitrarily selected state 2) as 00100000. But in other circumstances based on parallel evolution, successive states are illustratively represented as 00000010, 00110000, 11000100, 00001000, or any other defined-state representation. In this illustrative state sequence representation, the first two transitions reflect divergent parallel evolution (one-state to two-state and two-state to three-state), while the third transition reflects convergent (three-state to one-state) parallel evolution.

In accordance with another aspect of illustrative embodiments of the present invention, transitions between discrete states of a finite state machine are advantageously executed on positive edges of asynchronous spiking inputs to the finite state machine. Thus, unlike conventional synchronous machines, no external clock is necessary for machine operation; transitions are self timed by such asynchronous spiking inputs. Moreover, an arbitrary number of spiking inputs may be applied at the same time.

In accordance with yet another aspect of illustrative embodiments of the present invention, a uniform transition circuit directs transitions between states in a finite state machine. Thus, a finite state machine having many states is conveniently implemented using many copies of this transition circuit,—each having its particular set of inputs.

BRIEF DESCRIPTION OF THE DRAWING

A fuller understanding of the present invention will be had by a consideration of the following detailed description taken together with the attached drawing, wherein.

DETAILED DESCRIPTION

A finite state machine, in accordance with illustrative embodiments presented herein, is advantageously implemented as a set of building-block circuits. Illustrative building block circuits for use in or with illustrative embodiments of the present invention include (i) spike-generating circuits, (ii) bistable element circuits and (iii) circuits for effecting a transition from one state to another in finite state machines in response to one or more spiking inputs. Portions of one or more of these kinds of circuits will also prove useful in particular embodiments, especially in parallel evolution applications, as will appear from the discussion below.

Spiking signals are characteristic of certain neuron circuits, as is well known in the art. See generally, Mead, C., "Analog VLSI and Neural Systems," Addison-Wesley, Reading, 1989. The incorporated concurrently-filed patent application by R. Sarpeshkar entitled "Spiking Neuron Circuit" includes examples of "spiking signals" (and circuits for generating them), and the incorporated patent application by R. Herrera and R. Sarpeshkar entitled "Edge-Triggered Toggle Flip-Flop Circuit" provides other examples of circuits, including bistable element circuits, responsive to spiking signals.

Figure 1A:
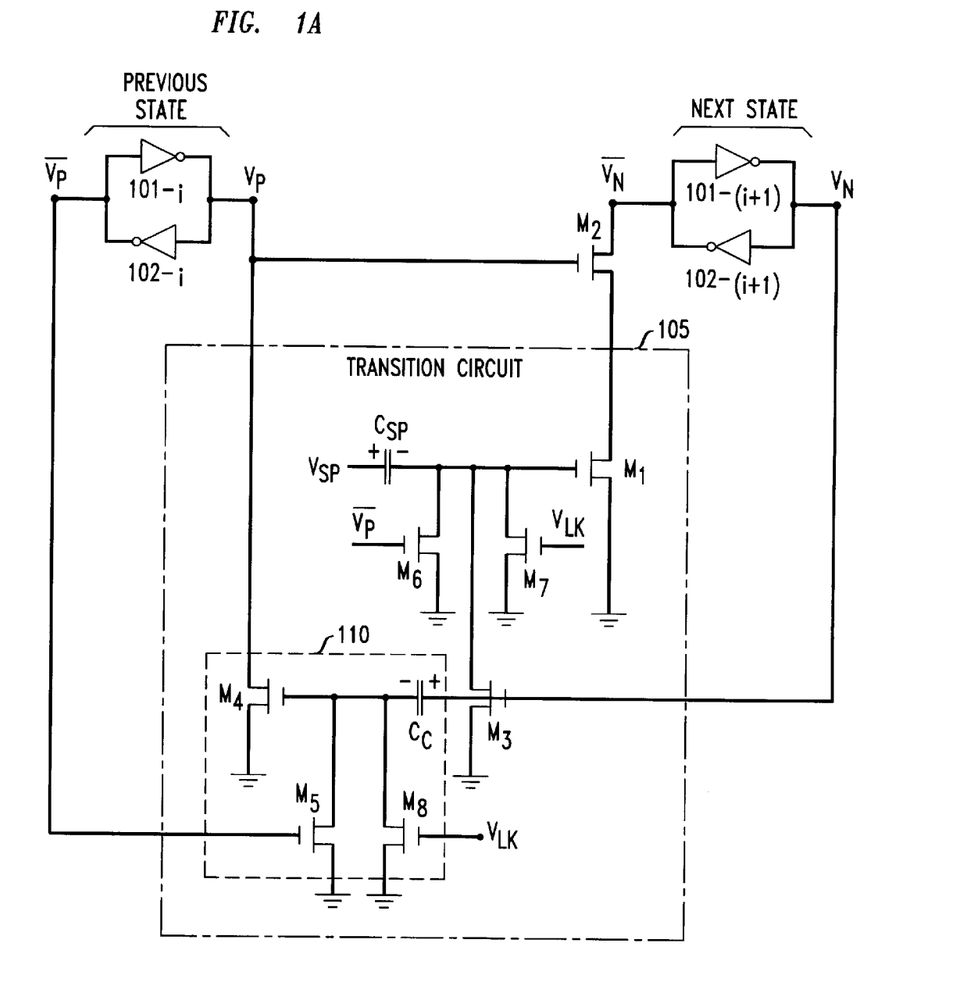
FIG. 1A shows a schematic diagram of a first illustrative embodiment of a transition circuit effecting state changes by controlling bistable elements in a finite state machine.
Figure 1B:
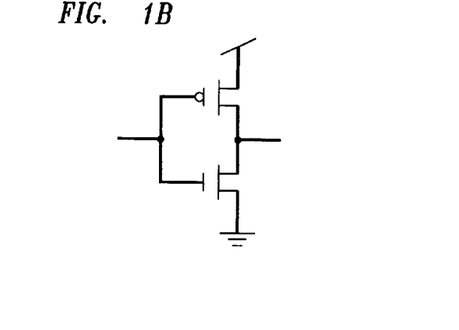
FIG. 1B shows a schematic diagram of an illustrative inverter configuration useful for cross connecting in pairs to form bistable elements shown in FIG. 1A.

FIG. 1A illustrates how a transition is implemented in a finite state machine comprising a plurality of bistable elements such as the cross-coupled inverters 101-i and 102-i, i=1, 2, . . . , n. An illustrative inverter circuit suitable for use in the circuit of FIG. 1A is shown in FIG. 1B. These cross-coupled inverters encode the present state from which a transition is made: cross-coupled inverters 101-i and 102-i provide respective outputs $V_i$ and $\overline{V}_i$. If the finite state machine is in the state i, then $V_i$ is at or near one of the supply rail voltages (taken for illustrative purposes as $V_{DD}$) while $\overline{V}_i$ is illustratively at or near ground. Thus, to transition from state p to state n, $V_p$ is set to ground and $V_n$ to $V_{DD}$. Transition circuit 105 is a convenient grouping of illustrative circuit elements used to accomplish such state transition. Operation of this transition circuit 105 will be described more completely below.

Figure 1C:
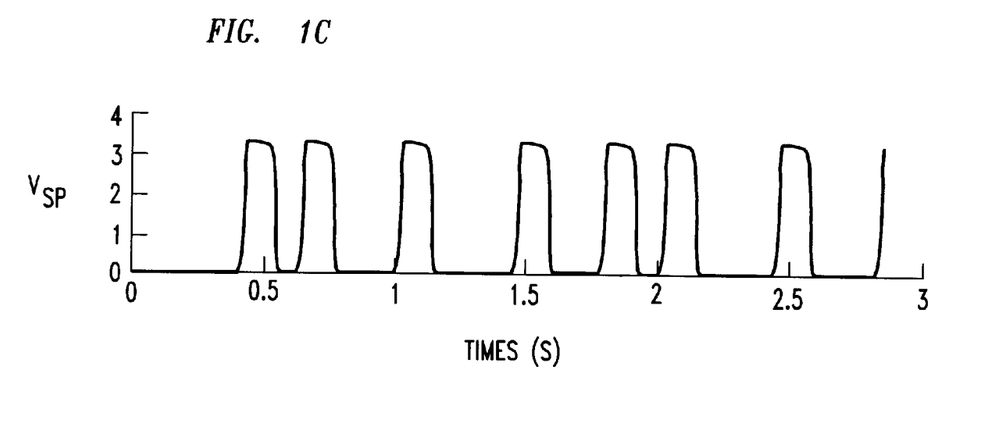
FIG. 1C shows an illustrative sequence of spiking input signals; in general, each transition circuit will receive a differing pulse input sequence.

The configuration of cross-coupled inverters 101-i and 102-i ensures that the signals $\overline{V}_p$ and $\overline{V}_n$ assume values that are inverted with respect to $V_p$ and $V_n$, respectively. In the circuit of FIG. 1A, it is assumed for purposes of illustration that $V_p$ is initially at $V_{DD}$ and $V_n$ is initially at ground. To effect a transition to state n, $V_p$ is set to ground and $V_n$ is set to $V_{DD}$ in response to the arrival of the positive edge of a spiking input $V_{sp}$. An illustrative sequence of spiking input signals is shown in FIG. 1C, though no particular sequence is required for operation of the finite state machines described herein. That is, in general spiking input signals not only occur asynchronously, but are different for respective transition circuits and, in any event, will change over time.

In the circuit of FIG. 1A, $V_{lk}$ is set to bias $M_7$ very weakly. Since it is assumed that $V_p$ is at $V_{DD}$ and $\overline{V}_p$ at ground, the positive edge of the spiking input $V_{sp}$ is capacitively coupled via $C_{sp}$ to the gate of transistor $M_1$, thus turning $M_1$ to its on state. Transistors $M_6$ and $M_7$ transistors may be regarded as being off for purposes of affecting the capacitively coupled edge of spiking input $V_{sp}$. As $V_p$ is at $V_{DD}$, $M_2$ is on, and the series combination of $M_2$ and $M_1$ sets $\overline{V}_n$ to ground in the $V_n$-$\overline{V}_n$ latch (cross-coupled inverters 101-(i+1) and 102-(i+1)). Consequently, $V_n$ is set to $V_{DD}$. It proves necessary to set the W/L ratios for transistors $M_1$ and $M_2$ to sufficiently large values to overwhelm the state of the latch. Thus, e.g., a W/L ratio on the order of five times that for other transistors in the transition circuit will prove advantageous. When $V_n$ reaches $V_{DD}$, $M_3$ is turned on, thereby connecting the gate of transistor $M_1$ to ground to turn $M_1$ off.

As $\overline{V}_p$ is initially at ground, $M_5$ is off. Since $M_8$ is weakly biased by $V_{lk}$, the rising edge of $V_n$ is capacitively coupled via $C_c$ to activate the gate of $M_4$ to a value near $V_{DD}$. (The path from $V_n$ to $C_c$ is shown in standard notation as passing through transistor $M_3$.) The transistor $M_4$ then resets the state of the $V_p$-$\overline{V}_p$ latch (cross-coupled inverters 101-i and 102-i) such that $V_p$ is at ground, and, consequently $\overline{V}_p$ is at $V_{DD}$. When $\overline{V}_p$ then reaches $V_{DD}$, $M_5$ resets the gate of $M_4$ to ground and the transition is complete.

Transistors $M_7$ and $M_8$ advantageously prevent negative voltage pulse edges from $C_{sp}$ and $C_c$ inputs from causing the gate voltages of the $M_1$ and $M_4$ transistors to have large negative excursions: If these latter voltages are too negative, these transistors will turn on and restore the voltage to ground. Desirably, parasitic pn junctions that occur at the source and drain of the MOSFETs connected to these gates also help prevent large negative excursions.

Capacitor $C_c$ ensures that the $V_p$-$\overline{V}_p$ latch is reset only during the transition initiated by the spiking signal $V_{sp}$. If, instead, the reset of this latch is performed using d.c. coupling from the $V_n$-node to the $M_4$ transistor, then it would be impossible to reenter the $V_p$-state until a transition had been made from $V_n$-state to some other state. Such d.c. coupling would cause the transistor $M_4$ to be active and keep $V_p$ at ground as long as $V_n$ is at $V_{DD}$; the only way to then set $V_n$ to ground would be to leave the $V_n$-state for some other state. In the capacitively coupled topology of FIG. 1A, $M_4$ is only active for a limited time following the transition of $V_n$ to $V_{DD}$. Thus, reentry to the $V_p$-state from the $V_n$-state is possible. Of course, in finite state machines that do not require reentrant transitions from one state to another, d.c coupling may be used, and $C_c$ and $M_5$ may be eliminated.

Note that all inactivations of an input that sets a latch on one side of the latch are accomplished by inactivation of that input from the opposite side of the latch, e.g., the inactivation of the gate of $M_1$ by $V_n$ and $M_3$, or the inactivation of the gate of $M_4$ by $\overline{V}_p$ and $M_5$. Such inactivations ensure that the input on one side of the latch is inactivated only after the propagation delay of the latch has changed the voltage on the other side of the latch by a sufficient amount; the latch can then complete the transition started by the input even if the input is inactive.

Weak inactivation transistors (small W/L ratios on $M_3$ and $M_5$) make latch transitions more robust because the voltage on the opposite side of the latch must change by a large amount before inactivation is effective. However, extremely weak inactivation transistors can create large capacitive loads on the opposite side of the latch (because of their large channel length) and adversely affect the transition by making it happen at a rate that is slower than the inactivation. An illustrative W/L value for $M_3$ and $M_5$ that is about one-half that of the W/L values of other transistors in the circuit is conservative and works well for typical implementations. In addition, a weak inactivation transistor minimizes capacitive kickback during inactivation on the input that activated it, e.g., a weak $M_5$ transistor minimizes capacitive kickback on the $V_n$-node through $C_c$, and a weak $M_7$ transistor minimizes capacitive kickback on the $V_{sp}$ input through $C_{sp}$.

Transistor $M_2$ is gated by $V_p$ and ensures that no transition occurs unless $V_p$ is at $V_{DD}$. The transistor $M_6$ ensures that the input spike $V_{sp}$ is not coupled to the gate of transistor $M_1$ unless $V_p$ is at $V_{DD}$; hence no transition occurs unless $V_p$ is at $V_{DD}$. Thus, both transistors perform the same function; the redundancy ensures that $M_2$ prevents a transition from occurring even if some voltage is coupled by $C_{sp}$ to the gate of $M_1$.

Transistors $M_6$ and $M_1$ prevent the state machine of FIG. 1A from implementing two consecutive state transitions in situations where it is designed to be making only one. Suppose that in a particular finite state machine there are two states $S_1$ and $S_2$, which have transitions that trigger on the same input spike $V_{sp}$. Suppose further that one of these transitions is meant to move the finite state machine from $S_1$ to $S_2$, and that the other transition is meant to move the finite state machine from $S_2$ to some other state $S_3$. If the finite state machine is in $S_1$ when a spike $V_{sp}$ arrives, $M_6$ ensures that the $S_1 \rightarrow S_2$ transition occurs while also ensuring that the multiple transition $S_1 \rightarrow S_2 \rightarrow S_3$ does not occur. Specifically, during the transition period when $S_1 \rightarrow S_2$, $M_6$ in the $S_2$–$S_3$ transition circuit has ensured that the gate of the $M_1$ transistor in this circuit is near ground, and that the input spike has not coupled successfully. Advantageously, the W/L ratio of $M_6$ is large but, has a small parasitic drain capacitance. (A ring transistor topology is therefore preferred for $M_6$.) Once $S_2$ becomes activated, a transition to $S_3$ cannot occur because the positive edge of $V_{sp}$ has terminated (or is near termination).

It is generally advantageous to have the W/L ratio of $M_1$ at a level not far above the minimum required to change the state of the $V_n$-$\overline{V_n}$ latch. A large ratio allows a small capacitively coupled voltage on the gate of $M_1$ to erroneously change the state of the latch. Such a situation could occur if part of the rising edge of a spike that triggered a transition to the $V_p$-state is successfully coupled to the gate of $M_1$. The partial coupling could occur because $V_p$ changes state to $V_{DD}$ during the duration of the rising edge. By having a moderate W/L-ratio on $M_1$ (2 is typical for $M_1$ and 3 is typical for $M_2$), the state of the latch changes only when a large voltage change in $V_{sp}$ is successfully coupled to the gate of $M_1$ because $\overline{V_p}$ is at ground.

Figure 2:
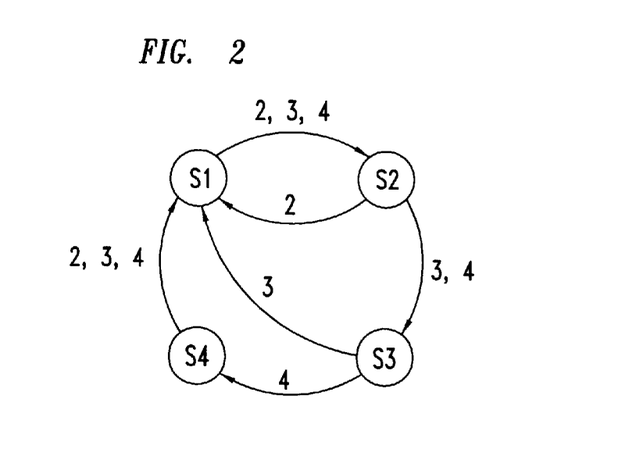
FIG. 2 shows an illustrative state transition diagram useful for understanding the operation of the circuit of FIG. 1A.
Figure 3A:
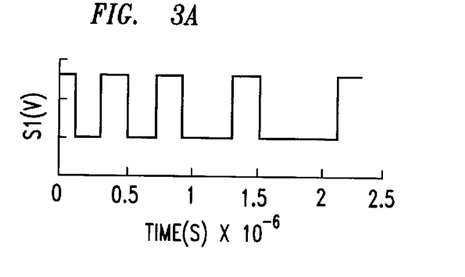
FIGS. 3A–G display waveforms characteristic of illustrative operation of the circuit of FIG. 1A.
Figure 3B:
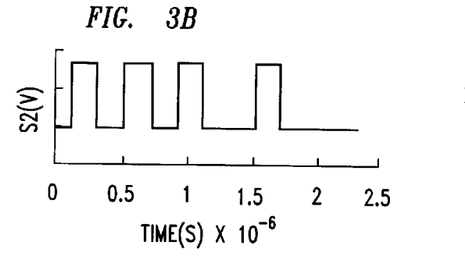
Figure 3C:
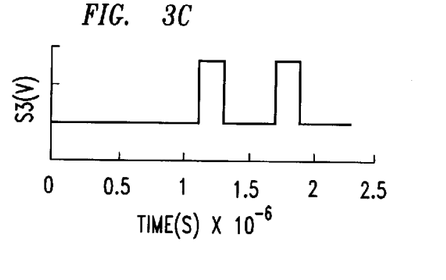
Figure 3D:
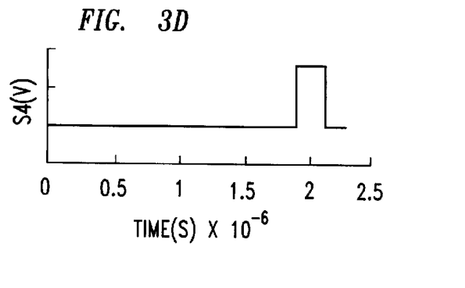
Figure 3E:
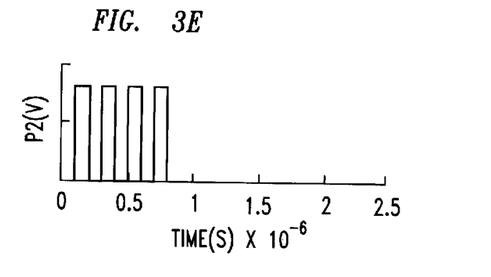
Figure 3F:
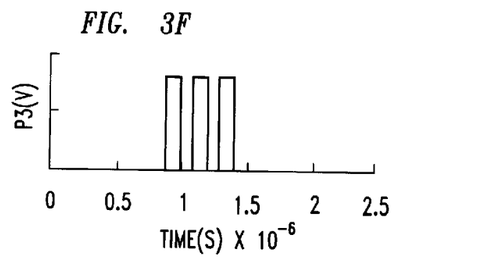
Figure 3G:
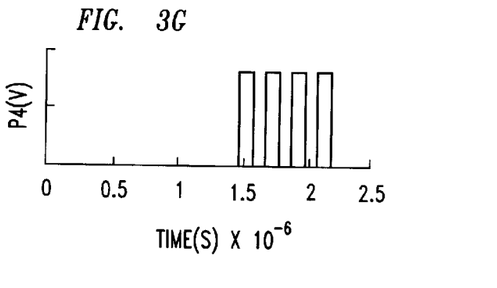

FIG. 2 shows a state diagram for an illustrative 4-state asynchronous spike-triggered finite state machine that makes input-spike-conditioned transitions between states. The circuit implementation of each node in this block diagram corresponds to a set of cross-coupled inverters, illustratively of the type shown in FIG. 1A, while the circuit implementation of each arrow (transition) in this state diagram corresponds to a transition circuit, illustratively of the type shown in FIG. 1B.

Particular spiking inputs that cause a transition from each state are labeled along the arrows in FIG. 2. Transitions that are triggered by more than one spiking input are illustratively accomplished by simply ORing together the spiking inputs that trigger that transition. Thus, in FIG. 2, the transition from state $S_1$ to state $S_2$ is accomplished by having $V_{sp}$ in the transition circuit of FIG. 1A be the output of a logical OR gate with spiking inputs 2, 3, and 4. Other logical operations, and implementation techniques suitable for realizing such logical operations are well known in the art.

FIGS. 3A–G shows illustrative waveforms arising in a finite state machine based on the state diagram of FIG. 2 and an illustrative set of inputs $P_2(V)$, $P_3(V)$ and $P_4(V)$ applied to respective transition circuits. Circuitry for realizing the finite state machine is advantageously based on the circuit arrangements of FIGS. 1A and 1B, illustratively using a 0.5 μm, 3.3V process with $V_{lk}$=1.2V, $C_c$=0.1pF, $C_{sp}$=0.1pF, and spike rise and fall times of about 1nS.

Thus, with the finite state machine initially having $S_1$ high, $P_2$ first causes $S_2$ to go high while $S_1$ goes low. Then, successive occurrences of $P_2$ pulses cause $S_1$ and $S_2$ to alternately achieve high states. The first of three $P_3$ pulses causes $S_2$ to achieve a high state and the next causes $S_3$ to go high; finally the third $P_3$ pulse causes $S_1$ to again go high. Pulses $P_4$ cause $S_2$ to go high, then $S_3$, $S_4$ and $S_1$ in turn. Continuing these sequences of spiking inputs will cause these state patterns to repeat and different inputs will result in different state transitions.

In the previously described illustrative circuit embodiment of FIG. 1A, coupling capacitors $C_{sp}$ and $C_c$ may sometimes be undesirably large in order to dominate with respect to the parasitic capacitances of the circuit. Thus, switching power dissipation of the circuit of FIG. 1A is sometimes correspondingly increased. An alternative illustrative circuit embodiment of the invention that is more suited for low-power operation is described below in connection with FIG. 4. This alternative illustrative embodiment will often prove to be more area efficient in some manufacturing contexts.

Figure 4:
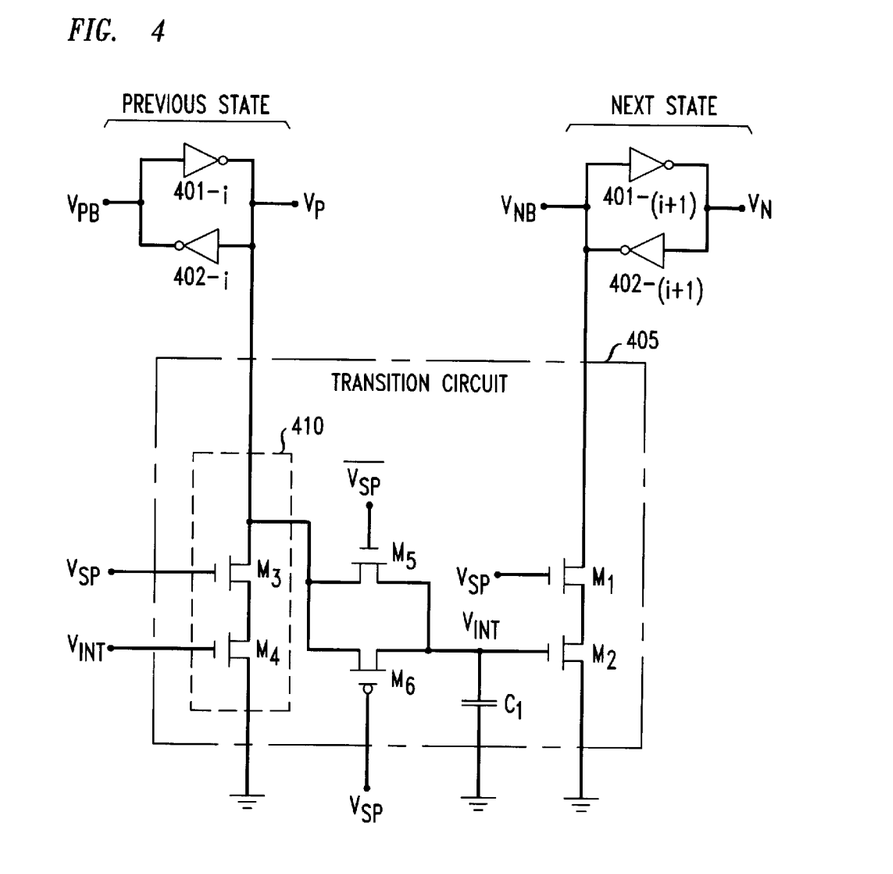
FIG. 4 shows schematic diagram of an alternative illustrative embodiment of a finite state machine employing a different transition circuit useful in effecting state changes.
Figure 5A:
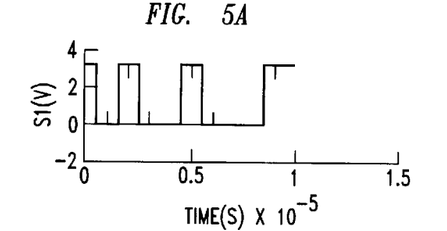
FIGS. 5A–G display waveforms characteristic of illustrative operation of the circuit of FIG. 4.
Figure 5B:
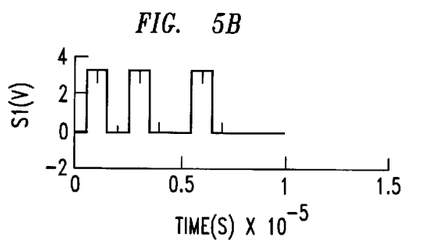
Figure 5C:
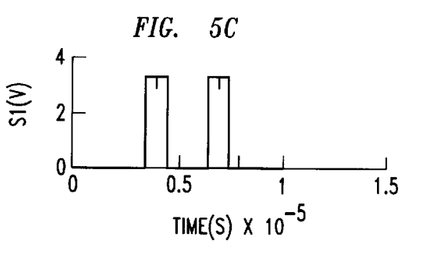
Figure 5D:
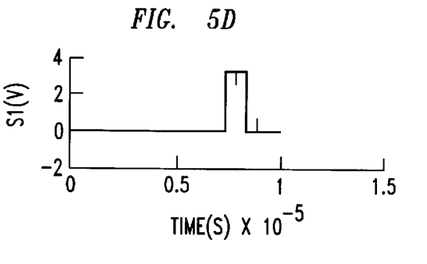
Figure 5E:
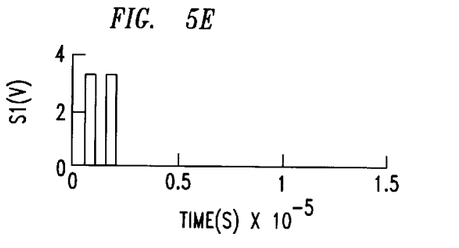
Figure 5F:
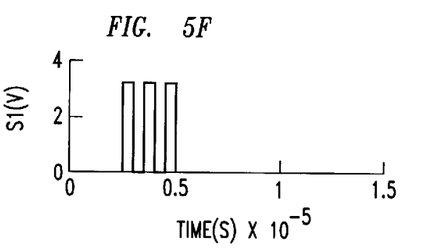
Figure 5G:
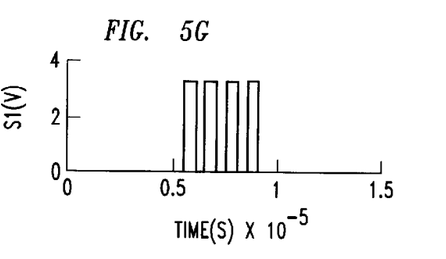

FIG. 4 shows cross-coupled latches 401-i and 402-i (and 401-(i+1) and 402-(i+1)) encoding previous and next states, respectively, as in the circuit of FIG. 1A. Transistors $M_5$ and $M_6$ form a pass-transistor configuration operating as a switch responding to a spiking input signal (and its complement) to connect output terminals of a bistable device (illustratively the previous state bistable device 401-i and 402-i) to capacitor $C_1$. Regarding pass-transistor configurations, see generally, J. M. Rabaey, *Digital Integrated Circuits*, Prentice-Hall, 1996, pp. 410–422. The complementary signal $\overline{V}_{sp}$ may be readily obtained by passing $V_{sp}$ through a simple CMOS inverter (not shown), as will readily be appreciated by those skilled in the art.

When $V_{sp}$ is low, the pass-transistor switch is turned on and $V_{int}$, the voltage on $C_1$, tracks the voltage $V_p$. When $V_{sp}$ is high, $V_{int}$ holds its previous value. Typically, $C_1$ is not an explicit capacitance, but arises as a parasitic capacitance in device manufacture. Prior to the arrival of a spike, the voltage $V_{int}$ on $C_1$ is at the value of $V_p$, a voltage it maintains for the duration of a spike. The transition from $V_p$ being high to $V_n$ being high is implemented as follows: Since $V_p$ is high, $V_{int}$ is high prior to and during the spike $V_{sp}$, as indicated. During the active high phase of $V_{sp}$, transistors $M_3$ and $M_4$ reset $V_p$ to ground and transistors $M_1$ and $M_2$ reset $V_{nb}$ to ground, and consequently $V_n$ to $V_{DD}$.

As with the circuit arrangement of FIG. 1A, a finite state machine implemented in accordance with the circuitry of FIG. 4 employs one latch to implement each state in the machine. The arrangement of FIG. 4 also employs one circuit composed of transistors $M_1$–$M_6$ operating in accordance with the above described inventive principles to implement each transition. Again logical pulse inputs are combined in accordance with well-known practice to achieve the $V_{sp}$ spiking input signal. The bistable device outputs (and time sequences of them) will, in accordance with well known principles be used to generate other particular outputs. Thus, for example outputs resulting from a transition from a particular first state to a particular second state may be selected to generate a desired output by combining a stored last state with a present state after a transition is complete.

FIGS. 5A–G show illustrative waveforms of the finite state machine of FIG. 2 implemented with the circuit arrangements of FIG. 4. The description of inputs and state changes given above for FIGS. 3A–3G apply to the operation of the circuit of FIG. 4 with inputs shown in FIGS. 5E–G.

Behavior of finite state machines based on the inventive contributions described above for the circuit arrangements of FIGS. 1A and 4 is very similar when identical inputs are applied to each. Minor glitches seen in the waveforms of FIG. 5 are due to transitory drops in output latch voltages as the pass-transistor configuration transitions from hold mode to tracking mode; the transition changes the capacitive load on the inverters in these latches and consequently yields the indicated minor glitches.

While the descriptions above have emphasized transitions from one single state to another single state, with each state represented by a single bistable element, the broader teachings of the present invention also relate to transitions from any number of states to any other number of states, each represented by a single bistable element. Such multiple state transitions are particularly useful in applications employing parallel evolution techniques, as will become readily apparent from a consideration of FIG. 6.

Figure 6:
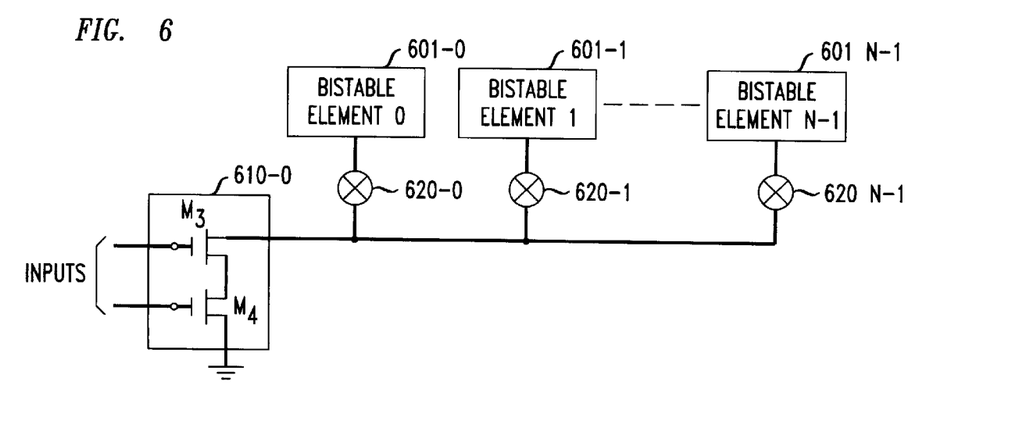
FIG. 6 shows an illustrative reset circuit for simultaneously applying reset signals to a number of bistable elements in response to spiking inputs.

FIG. 6 is a simple example employing the resetting circuitry (shown as 610-i, with an illustrative case of i=0) of the circuit of FIG. 4 (illustratively including transistors $M_3$ and $M_4$ from FIG. 4) to reset a number of bistable elements. Thus with appropriate inputs, determined by the desired state transitions, at the input of reset circuit 610-k (illustratively 610-0) and with appropriate switches 620-j enabled by other input signals, any number of bistable elements 601-i can be reset. Of course, any number of reset circuits 610-k may be used, and the input signals may include or reflect any logic functions defining the required reset conditions. Those parts of the transition circuit shown in FIG. 4 other than transistors $M_3$ and $M_4$ are advantageously included in the circuitry represented for simplicity of presentation as bistable elements 601-i.

Likewise, the reset circuitry of FIG. 1A will be adopted by those skilled in the art to perform in like manner to the circuitry of FIG. 6. Thus, for example reset circuitry 110 shown in FIG. 1A may be adapted for use in place of 610-k shown in FIG. 6 (with suitable adaptation of the remaining circuit elements of transition circuit 105 of FIG. 1A included in the bistable elements 601-i shown in FIG. 6). Other particular circuit arrangements for resetting (and setting) bistable elements 601-i within the spirit and scope of the present invention will be clear to those skilled in the art in light of the present teachings.

Specification of inputs to reset circuitry 610-k and switches 620-j in FIG. 6 will in some cases advantageously be accomplished using field programmable gate arrays or similar control arrays as inputs. In other applications, neuron circuit spikes will advantageously be logically manipulated using known neuron spike logic techniques. Setting of particular states upon resetting of states is conveniently accomplished using steering controls such as switches 620-j and, where appropriate, double rail signals for application to the circuitry shown as bistable elements 601-i in FIG. 6.

Those skilled in the art will understand that device types, manufacturing process, polarities and parameter values used in the above-described embodiments of the present invention are merely illustrative. Other embodiments, variations and uses within the spirit of the present invention will be apparent to those skilled in the art in light of the present inventive teachings.

What is claimed is:

1. An n-state finite state machine, n>2, comprising
    n bistable elements, each comprising first and second output terminals, each said bistable element existing
        in a 1 state when said first output terminal is at a first signal level and said second output terminal is at a second signal level, and
        in a 0 state when said first output terminal is at said second signal level and said second output terminal is at said first signal level,
    at least one of said bistable elements being in said 1 state,
    at least one transition circuit adapted to receive at least one spiking pulse signal input for selectively changing states of identified ones of said bistable elements, said transition circuit comprising
        first means for applying a signal having said second level to said second output terminal of each of said identified ones of said bistable elements, and
        second means for applying a signal having said second level to said first output terminal of said identified ones of said bistable elements.

2. The finite state machine of claim 1 wherein said bistable devices are latches.

3. The finite state machine of claim 2 wherein said latches have complementary outputs approximately equal to first and second power supply rail voltages.

4. The finite state machine of claim 3 wherein said latches comprise cross-connected inverter circuits.

5. The finite state machine of claim 3 wherein said first signal level is approximately equal to said first power supply rail voltage and said second voltage is approximately equal to said second power supply rail voltage.

6. The finite state machine of claim 5 wherein said second power supply rail voltage is a ground reference voltage.

7. An n-state finite state machine comprising
    n bistable latches, each latch comprising first and second output terminals, each said latch existing
        in a 1 state when said first output terminal is at a first signal level and said second output terminal is at a second signal level, and
        in a 0 state when said first output terminal is at said second signal level and said second output terminal is at said first signal level,
    where said first and second signal levels are approximately equal to first and second supply rail voltages, and at least one of said bistable elements is in said 1 state,
    at least one transition circuit adapted to receive at least one pulse signal input for selectively changing states of identified ones of said bistable elements, said transition circuit comprising
        first means for applying a signal having said second level to said second output terminal of each of said identified ones of said bistable elements, and
        second means for applying a signal having said second level to said first output terminal of said identified ones of said bistable elements
    wherein said at least one pulse input signal comprises a spiking pulse input signal, said first means comprises a first transistor connected in a path between the second output terminal of said identified bistable circuits and said second voltage, and a first capacitor for coupling a transition of a first polarity in said spiking pulse input signal to the gate of said first transistor, thereby causing said second output of said identified bistable element to approach said second voltage and said first output of said identified bistable circuit to rapidly change to a voltage approaching said first voltage.

8. The finite state machine of claim 7 wherein said second means comprises a second transistor connected in a path between the first output terminal of said bistable circuit in said 1 state and said second voltage, a second capacitor for coupling said rapidly changing signal on said first output of said identified bistable device to the gate of said second transistor, thereby causing said first output of said bistable circuit in said 1 state to approach said second voltage and said second output of said bistable circuit in said 1 state to approach said first voltage.

9. The finite state machine of claim 8 wherein said transition circuit further comprises means responsive to said rapidly changing voltage on said first output of said identified bistable device for disabling said first transistor, thereby opening said path including said first transistor between second output terminal of said identified bistable circuit and said second voltage.

10. The finite state machine of claim 9 wherein said transition circuit further comprises a forward biased transistor connecting said first capacitor to said second rail voltage to inhibit effects of changes in said spiking input signal of other than said first polarity.

11. The finite state machine of claim 8 wherein said transition circuit further comprises means responsive to said changing voltage on said second output of said identified bistable element for disabling said second transistor, thereby opening said path including said second transistor between said first output terminal of said bistable element in said 1 state and said second voltage.

12. The finite state machine of claim 11 wherein said transition circuit further comprises a forward biased transistor connecting said second capacitor to said second rail voltage to inhibit effects of changes of other than said first polarity in voltage on said second output of said bistable elements.

13. An n-state finite state machine comprising n bistable elements, each comprising first and second output terminals, each said bistable element existing in a 1 state when said first output terminal is at a first signal level and said second output terminal is at a second signal level, and in a 0 state when said first output terminal is at said second signal level and said second output terminal is at said first signal level, one of said bistable elements being in said 1 state, at least one transition circuit adapted to receive at least one spiking input signal for changing said bistable element in said 1 state to said 0 state and changing identified other ones of said bistable elements to a 1 state, said transition circuit comprising a capacitor storing a voltage that tracks the voltage on said first output terminal of said bistable element in said 1 state when said spiking input signal is inactive, said capacitor maintaining the voltage existing at the time a spiking input signal transition of a first polarity occurs for the period said spiking input signal remains active, first means responsive to said voltage on said capacitor and said spiking input signal for applying a signal having said second level to said second output terminal of said identified one of said bistable elements, and second means responsive to said spiking input signal for applying a signal having said second level to said first output terminal of said bistable element in said 1 state.

14. The n-state finite state machine of claim 13 wherein said transition circuit further comprises a switch connecting said first terminal of said bistable element in said 1 state to said capacitor when said spiking input signal is in an inactive state.

15. The n-state finite state machine of claim 14 wherein said switch comprises a pass-transistor combination.

16. The finite state machine of claim 13 wherein said bistable devices are latches.

17. The finite state machine of claim 16 wherein said latches have complementary outputs approximately equal to first and second power supply rail voltages.

18. The finite state machine of claim 17 wherein said latches comprise cross-connected inverter circuits.

19. The finite state machine of claim 18 wherein said first signal level is approximately equal to said first power supply rail voltage and said second voltage is approximately equal to said second power supply rail voltage.

20. The finite state machine of claim 19 wherein said second power supply rail voltage is a ground reference voltage.

21. The finite state machine of claim 15 wherein said first means comprises first and second gates connected in a path between said second output terminal of said identified one of said bistable elements and said second voltage, said first gate being activated by said voltage on said capacitor, and said second gate being activated by said transition of a first polarity.

22. The finite state machine of claim 15 wherein said second means comprises third and fourth gates connected in a path between said first output terminal of said bistable element in said 1 state and said second voltage, said third gate being activated by said voltage on said capacitor, and said fourth gate being activated by said transition of a first polarity.

* * * * *